Dec. 14, 1965

B. M. TURNER 3,222,888

METHODS AND APPARATUS FOR MANUFACTURING
INTERLOCKED LOOPED FABRIC

Filed May 15, 1962

INVENTOR
BERNARD MOISE TURNER

BY *Dwight B. Galt*

ATTORNEY

Dec. 14, 1965        B. M. TURNER        3,222,888
METHODS AND APPARATUS FOR MANUFACTURING
INTERLOCKED LOOPED FABRIC
Filed May 15, 1962        7 Sheets-Sheet 2
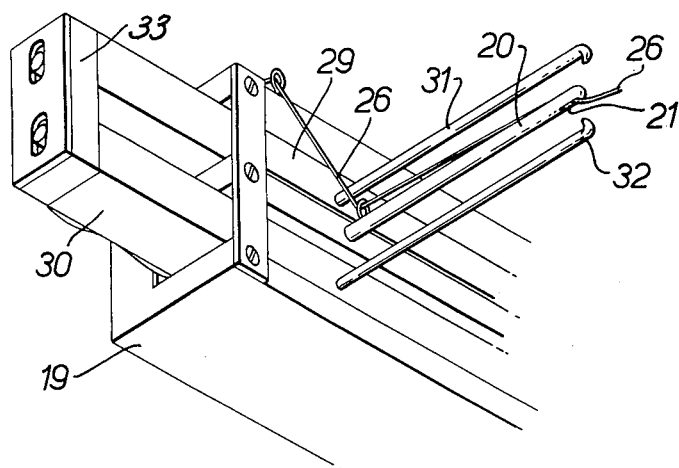
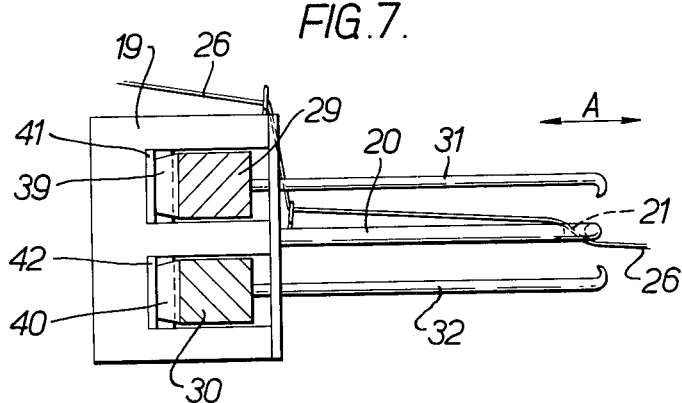
INVENTOR
BERNARD MOISE TURNER
BY Dwight B. Galt
ATTORNEY Dec. 14, 1965     B. M. TURNER     3,222,888
METHODS AND APPARATUS FOR MANUFACTURING
INTERLOCKED LOOPED FABRIC
Filed May 15, 1962     7 Sheets-Sheet 3
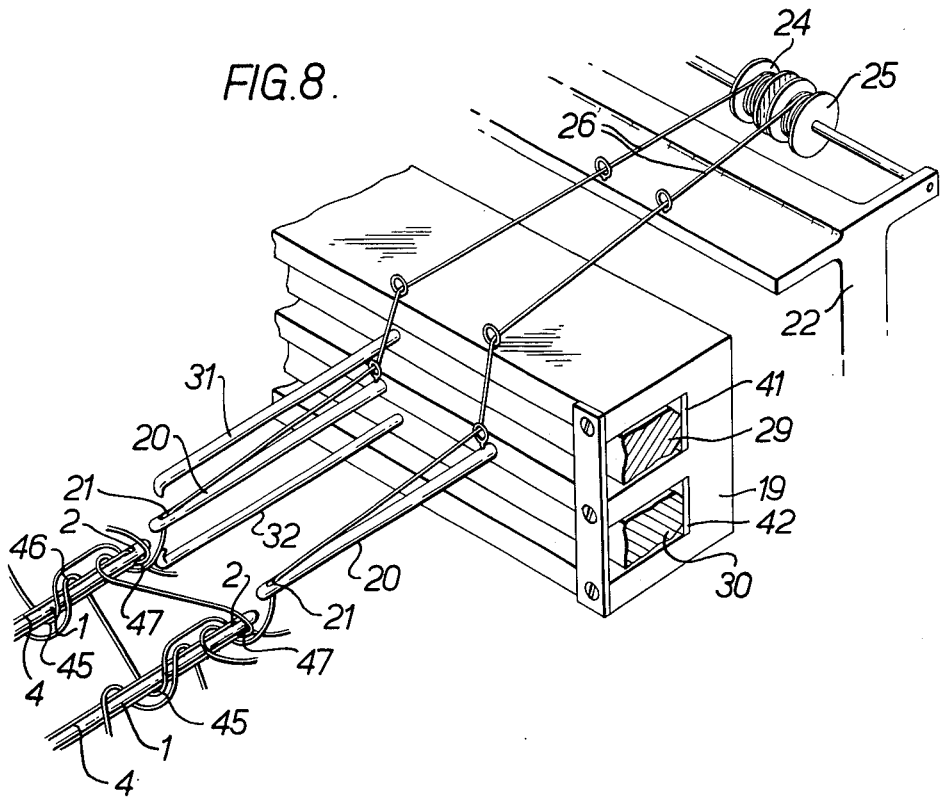
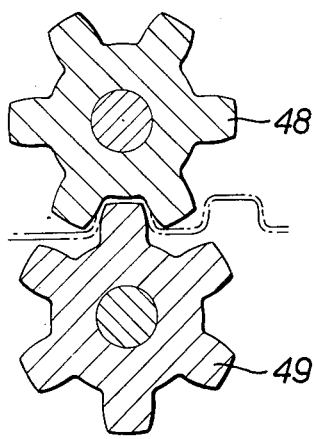
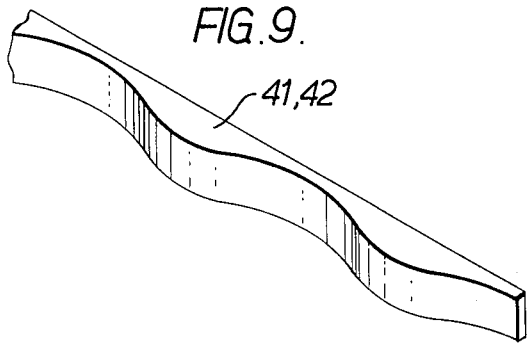
INVENTOR
BERNARD MOISE TURNER
BY Dwight B Galt
ATTORNEY Dec. 14, 1965  B. M. TURNER  3,222,888
METHODS AND APPARATUS FOR MANUFACTURING
INTERLOCKED LOOPED FABRIC
Filed May 15, 1962  7 Sheets-Sheet 4

INVENTOR
BERNARD MOISE TURNER
BY Dwight B. Galt
ATTORNEY

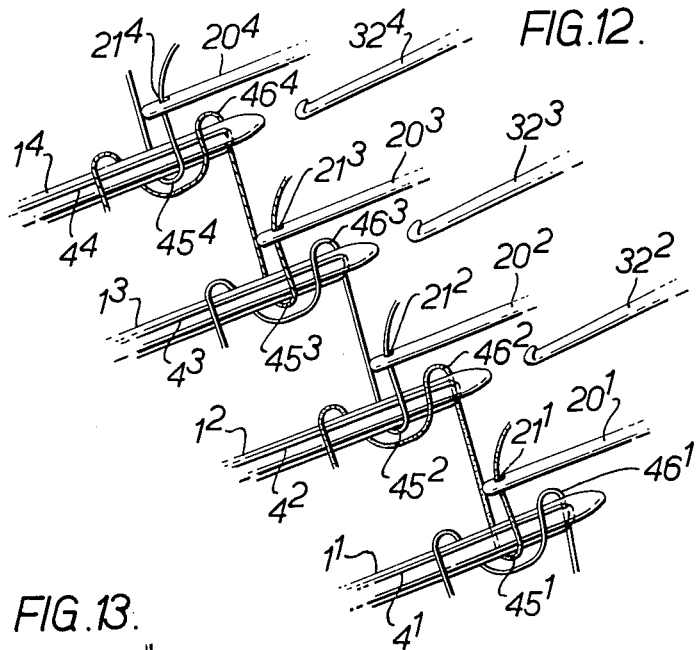
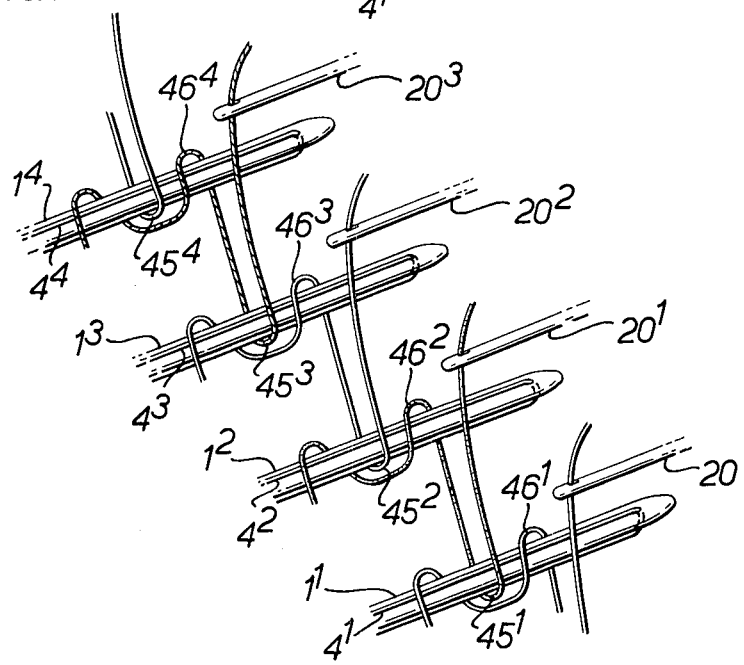

INVENTOR
BERNARD MOISE TURNER
BY Dwight B. Galt
ATTORNEY

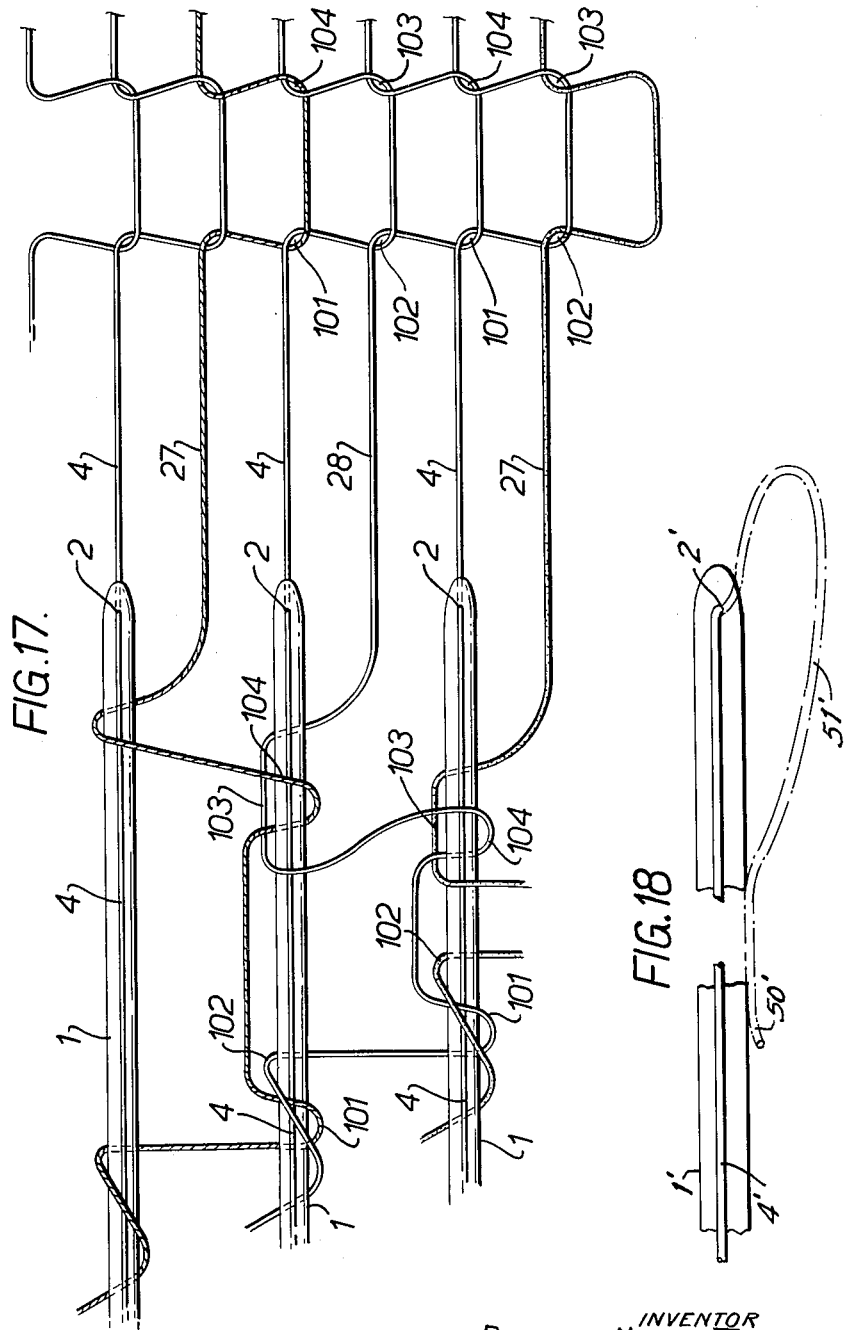

United States Patent Office 3,222,888
Patented Dec. 14, 1965

3,222,888
METHODS AND APPARATUS FOR MANUFACTURING INTERLOCKED LOOPED FABRIC
Bernard Moise Turner, 3A Marston Ferry Road, Oxford, England
Filed May 15, 1962, Ser. No. 194,886
8 Claims. (Cl. 66—1)

The present application being a continuation-in part of my application Serial No. 789,382, filed January 27, 1959 now abandoned.

This invention relates to a method and apparatus for manufacturing interlocked looped fabric.

Fabric manufactured in accordance with this invention is particularly, but not exclusively, applicable to the manufacture, of ladies' sheer hosiery. Fabric usually employed for stockings possesses the serious disadvantage that, if a loop in the fabric is broken, a whole wale tends to unravel and produce what is commonly called "a ladder." This applies especially to nylon stockings in which long ladders tend to form with extreme rapidity.

Many attempts have been made to prevent laddering in stockings and other fabrics utilizing various run-resistant or run-proof knits other than the plain knit loop structure. For example, in mesh, lace or fish-net knits a portion of the loop heads is spread to adjoining wales. Loops may also be transferred from wale to wale and at the same time from course to course.

All these various known alternative knits, however, have disadvantages, particularly when incorporated into ladies' sheer hosiery. Such disadvantages may arise from loss of elasticity or sheerness or a pattern other than plain knit may prove incompatible with the dictates of fashion.

It is an object of my invention to produce a fabric which overcomes the disadvantages of known fabrics and which is formed from rows of interlocked loops. In my fabric the loops of any one row, taken in one direction of the fabric, are made from the same yarn. By analogy with knitted fabric these rows of loops will be referred to herein as "courses" and the rows of loops at right angles thereto will be referred to as "wales."

According to this invention I provide a method of manufacturing an interlocked looped fabric lengthwise of the fabric courses comprising the steps of forming a loop in a course by passing yarn in front of one leg and behind the other leg of a formed loop in the same wale so that any two adjacent legs in a course are engaged by yarn of an adjacent course alternately from in front and from behind, the yarn positioned between the two legs of the formed loop then being made into a loop by yarn of the next succeeding course being passed in front of and behind the fabric yarn between the two legs, the manufacture continuing in this manner to produce a length of fabric.

When a loop in one course of fabric manufactured in accordance with this invention is broken, the loop in the next course on each side and in the same wale will be prevented from unravelling from the loop of the second next course on each side and in the same wale. The broken loop thereby forms a hole and does not extend into a ladder.

In more detail the method of manufacturing interlocked looped fabric according to my invention comprises rotating each guide needle of a number of parallel and coplanar guide needles in circular paths of substantially the same diameter to lay guide needle yarn around two adjacent receiving needles of a number of parallel and coplanar receiving needles, moving two hooks in elliptical paths around adjacent receiving needles so that a first hook catches yarn laid by a guide needle under the two adjacent receiving needles to form a loop in an alternate course over and around one of the two receiving needles, and so that a second hook catches yarn laid by the guide needle over the said two receiving needles to form a loop in the next alternate course under and around the other of the said two receiving needles, moving the hooks away from the receiving needles and the yarn, feeding the alternate course along the receiving needles as they are formed, catching yarn supplied to the receiving needles and drawing this yarn away from the receiving needles, clamping the receiving needle yarn and drawing the alternate course loops from the receiving needles over the clamped receiving yarn which forms intermediate courses between alternate courses of the fabric, and imparting tension in a walewise direction to open the course loops.

According to my invention I also provide apparatus for manufacturing interlocked looped fabric in a course-wise direction comprising a number of parallel and coplanar guide needles, a separate yarn supply for each guide needle for forming alternate courses of fabric, a number of parallel and coplanar receiving needles, a separate yarn supply for each receiving needle for forming intermediate courses of fabric between the alternate courses, means to move each guide needle to lay guide needle yarn around two adjacent receiving needles, a number of hooks disposed in planes on each side of the guide needles, means to move a hook disposed on one side of the guide needles, so that one run of the guide needle yarn laid around two adjacent receiving needles is given an additional turn around one of the said adjacent receiving needles to form a loop in an alternate course, means to move a hook disposed on the other side of the guide needles so that the other run of the guide needle yarn laid around the said two adjacent receiving needles is given an additional turn around the other of the said two adjacent receiving needles to form a loop in the next alternate course, means to catch yarn supplied to the receiving needles and means to draw this yarn away from the receiving needles, and means for removing alternate course loops formed around the receiving needles on to the drawn receiving needle yarn whereby there is formed a fabric in which the yarn forming each loop in a course passes behind one leg of the immediately preceding loop in the same wale and in front of its other legs so that no two adjacent legs of a loop in any one course are engaged by yarn of the adjacent course either from in front or from behind but alternately from in front and behind.

One form of apparatus in accordance with my invention will now be described in detail, by way of example, with reference to the accompanying drawings in which:

FIGURE 4 is an end view, looking from the left in FIGURE 2, with the receiving needles omitted and showing how the guide needles and hook bars are rotated;

FIGURES 6 and 7 show two views, to an enlarged scale, of the guide needles and hook bars;

FIGURE 8 illustrates a guide needle and a hook in a spiralling action with the driving means omitted for the sake of clarity;

FIGURE 9 is a detail view of a cam which is positioned to cause the backwards and forwards movement of one of the hook bars;

FIGURES 10 to 15 show a series of stages in the manufacture of the fabric;

FIGURE 16 illustrates a pair of stretching toothed rollers;

FIGURE 17 shows a plan view of fabric partly withdrawn from the receiving needles; and FIGURE 18 shows the position of the receiving needle yarn in the receiving needle.

Figure 1:
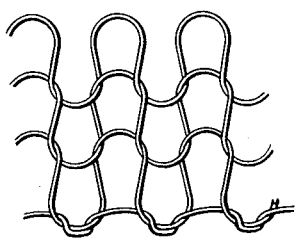
FIGURE 1 shows diagrammatically the interlocked loop structure of the fabric.

Referring to the drawings, a number of parallel and coplanar receiving needles 1 having eyes 2 are arranged in narrowly spaced relationship in a horizontal plane. The receiving needles 1 are screw threaded, or otherwise secured, in a receiving needle bar 3, and each needle is supplied with a separate yarn supply designated 4 from reels 5, 6, 7, etc. The receiving needles 1 are additionally supported at their operative ends between a pair of transverse rollers 8 and 9. These rollers 8 and 9 are driven rollers and are provided with peripheral grooves in which the receiving needles are located. In addition to supporting the receiving needles 1, the peripheral grooves in the rotating rollers urge loops as they are formed along the needles 1 away from their operative ends. Also positioned transversely beneath the receiving needles 1 are freely rotatable rollers 10 and 11, and a driven roller 12. An endless conveyor 13 is supported on the rollers 10, 11, 12 and 9, and tensioning of the conveyor is effected by means of roller 14. The roller 12 is connected to the main drive of the apparatus by a belt or gear and roller 9 is driven by the endless conveyor belt 13. The roller 8 is suitably connected by a belt or gear to the roller 12 or to the main drive to rotate in the opposite direction from the roller 9. The combined action of the rollers 8 and 9 and the belt 13 helps to pull the guide needle yarn spirals back from right to left as viewed in FIGURES 2 and 3 as they are formed about the receiving needles.

Figure 2:
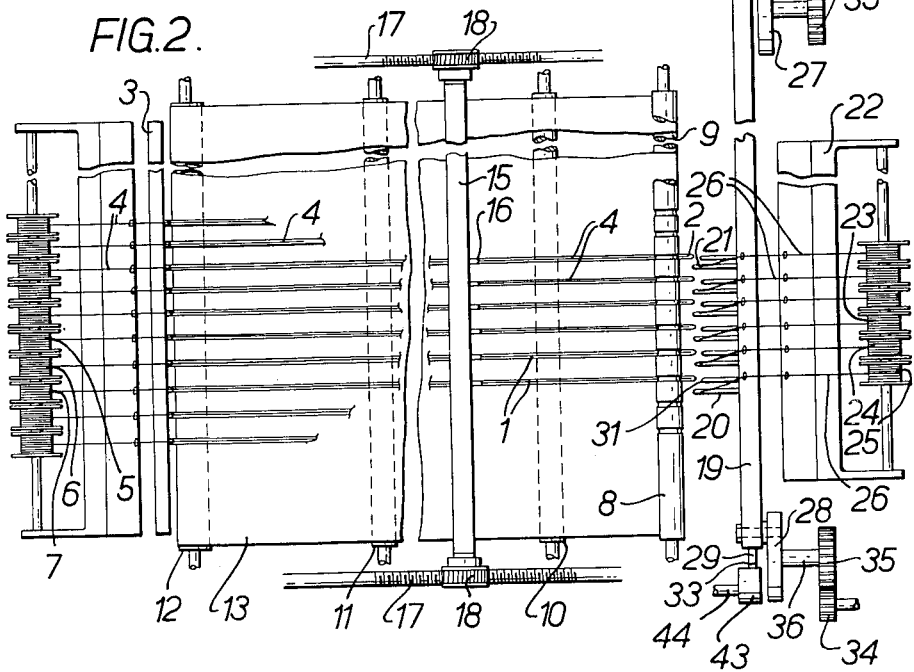
FIGURE 2 shows diagrammatically and in plan view the disposition of guide needles, receiving needles and hook bars, and for clarity, six needles only.
Figure 3:
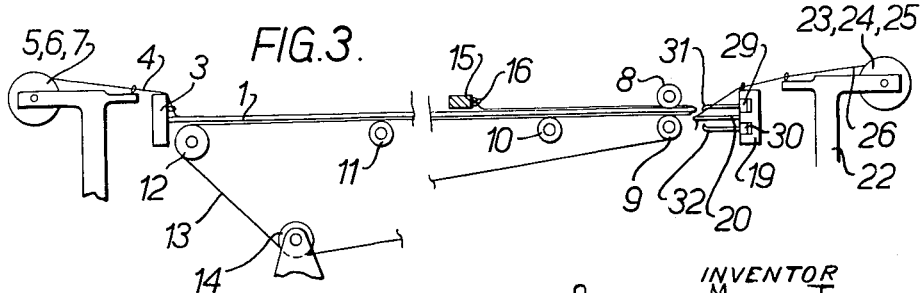
FIGURE 3 is a side view of FIGURE 2.

A transverse bar 15 (FIGURES 2 and 3) bridges the receiving needles 1 and has a number of retaining clips 16 to hold the ends of the courses as fabric loops are formed. The bar 15 is moved progressively and synchronously along the length of the receiving needles 1 (from right to left as FIGURES 2 and 3 are normally viewed) by means of a worm and worm wheel 17 and 18, respectively, as the loops are formed. Formed loops are thereby moved along the receiving needles by a combination of:

(i) transverse bar 15,
(ii) peripherally grooved rollers 8 and 9, and
(iii) conveyor belt 13.

Positioned transversely and adjacent the operative ends of the receiving needles is a guide needle bar 19 which carries a number of parallel and coplanar guide needles 20 in a horizontal plane. Each guide needle has an eye 21. A transverse frame member 22 is positioned behind and parallel to guide bar 19 and carries yarn reels 23, 24, 25 from which a separate yarn supply, generally designated 26 is fed to each guide needle 20. The guide needle bar 19 is pivoted at its end to two wheels 27 and 28 which are rotatable synchronously so that a circular path is imparted to the guide needles by means of eccentric pivot pins 27A and 28A attached to the wheels 27 and 28 respectively as shown in FIGURE 4.

The guide needle bar 19 (see FIGURES 6 and 7) is grooved to carry two parallel hook bars 29 and 30. The hook bars 29, 30 extend parallel with the guide bar 19 and carry hooks designated generally 31 and 32 disposed respectively above and below the guide needles 20. As shown in FIGURE 6 the hook bars 29, 30 project lengthwise beyond the end of the guide needle bar 19 and are interconnected by a link 33. The hooks 31, 32 when disposed in their central position are vertically above and below one of the guide needles 20, and in this position the hooked ends of the hooks 31, 32 are facing this guide needle 20.

Figure 5:
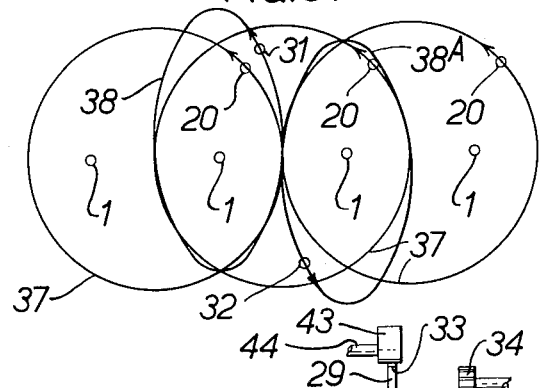
FIGURE 5 shows diagrammatically the circular and elliptical paths of the guide needle and hook bars respectively around the receiving needles which remain stationary.

The hook bars 29, 30 are eccentrically connected at each end to the wheels 27, 28 whereby rotation of the wheel 28, which is driven, causes the hooks to be moved in an elliptical path. The wheel 28 is rotated through suitably driven gearing 34 which drives a shaft 36 on which the wheel 28 is mounted. By this arrangement the wheels 27 and 28 are rotated synchronously. The gear 34 is connected by its shaft and other suitable means such as a belt and pulley or gears, to the main drive of the apparatus. During movement of each guide needle 20 in a circular path 37 (FIGURE 5) the associated hook needles 31, 32 are moved in elliptical paths 38 and 38A. The guide bar 19 is mounted so that the circular path 37 imparted to the guide needle 20 embraces two receiving needles 1 and has a diameter equal to twice the pitch of the receiving needles 1. The elliptical path 38 of the hooks 31, 32 has a major axis, disposed vertically, equal in length to or slightly less than the diameter of the circular path 37 to the guide needles 20 and a minor axis equal in length to the pitch of the receiving needles 1. In this arrangement, as shown in FIGURE 5, although the circular path 37 followed by the guide needles 20 embraces two receiving needles 1, the elliptical path 38 prescribed by the hooks 31, 32 embraces only one receiving needle 1. In addition to following an elliptical path 38 the hooks 31, 32 are also reciprocated towards and away from the operative ends of the receiving needles 1 in the direction of the arrow A in FIGURE 7. To accomplish this reciprocation the hook bars 29, 30 have associated followers 39 and 40 (FIGURE 7) which act on face cams 41 and 42 at the ends of the guide bar grooves, one of these face cams is illustrated in FIGURE 9. When the apparatus is in operation, due to the different paths traced out by the guide needles 20 and the hooks 31, 32 the hooks 31, 32 are reciprocated with respect to guide needles 20. The hook bars, interconnected by the link 33 are caused to carry out an elliptical path by moving the hook bars sideways in their grooves by means of a cam 43 rotatably mounted on a shaft 44. In other words the elliptical motion is the resultant of the circular motion of the guide needle bar 19 and the sideways sliding motion of the hook bars in their grooves in the guide needle bar. A further backwards and forwards movement is imparted to the hook bars as described above.

I shall now describe, with reference to the drawings how fabric is manufactured by apparatus according to my invention.

Figure 10:
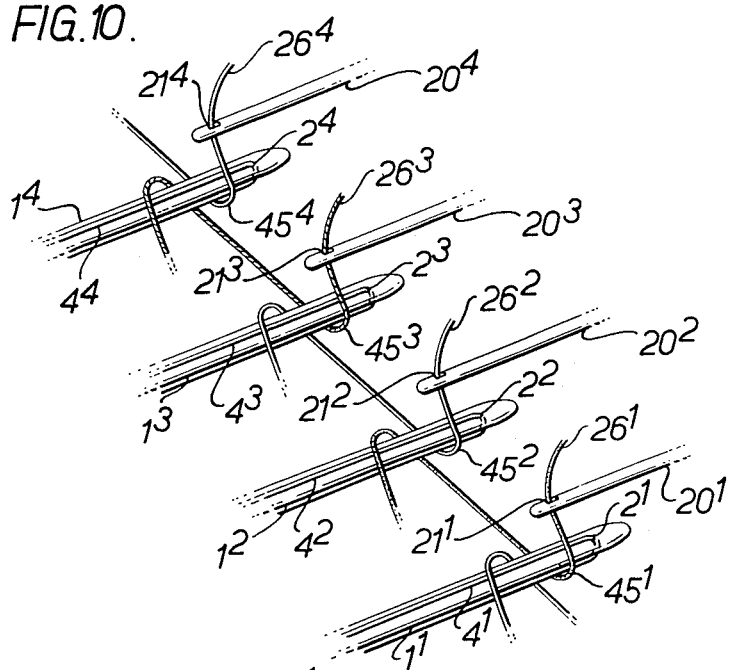

The direction of synchronous motion of the guide needles $20^1$, $20^2$, $20^3$, $20^4$, is counterclockwise around the receiving needles $1^1$, $1^2$, $1^3$, $1^4$, and each guide needle traces a circular path around two adjacent receiving needles. In order to describe a sequence of operations in the production of fabric in accordance with the invention we may conveniently start with a first movement of the guide needles under two adjacent receiving needles which lays yarn $26^1$, $26^2$, $26^3$ and $26^4$ under the receiving needles, see FIGURE 10.

As the guide needles move around the receiving needles to start their movement back across the top of the same two receiving needles a thread loop is formed, which I call a guide needle loop and which is on each receiving needle indicated by the reference 45.

Figure 11:
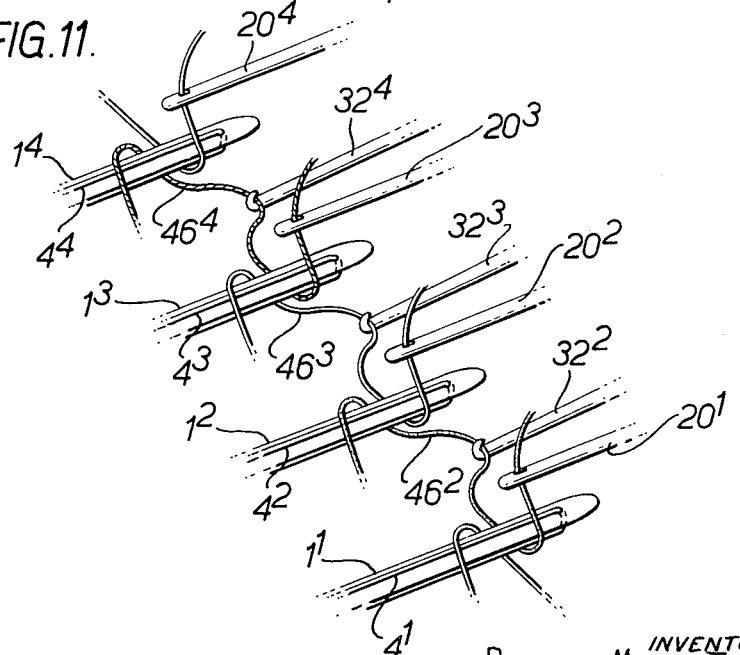

Synchronously with the formation of the guide needle loops 45 a lower hook 32 moves upwardly between adjacent receiving needles to form a second loop which I call a hook needle loop and which is indicated in FIGURE 11 by the reference 46. The formation of the loops 46 serves to take up slack yarn released in placing a previous hook needle loop around a receiving needle by means of an upper hook needle 31 as will be hereinafter described.

Further upward rotation and withdrawal of the lower hook needles 32 causes the hook needle loops 46 illustrated in FIGURE 11 to be passed over and around the receiving needles the motion being such that the hook needle loop $46^2$ is hooked over the needle $1^2$, the hook needle loop $46^3$ is hooked over the needle $1^3$ and so on. This stage in the development of the fabric is illustrated in FIGURE 12.

Figure 14:
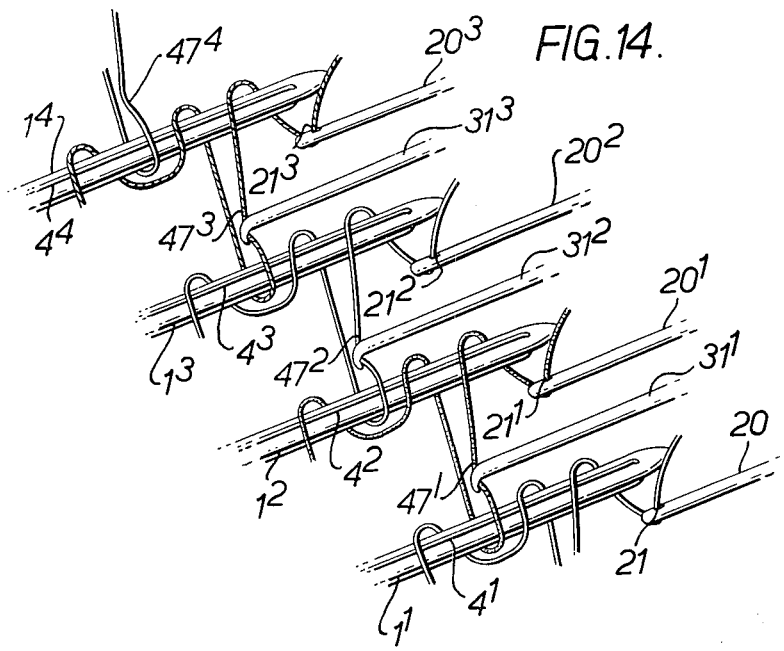
Figure 15:
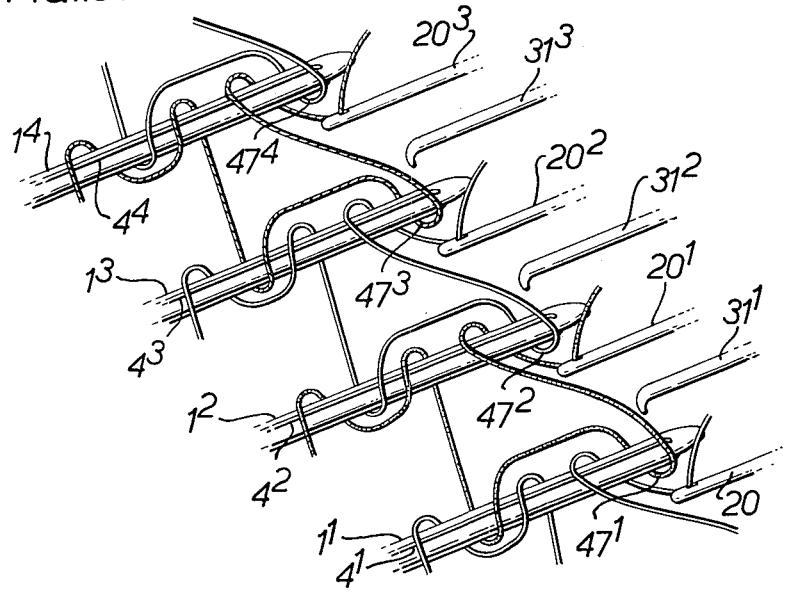

Simultaneously with the foregoing action by means of which the hook needle loops $46^1$, $46^2$, $46^3$, and $46^4$ are respectively hooked over the receiving needles $1^1$, $1^2$, $1^3$ and $1^4$ the guide needles $20^1$, $20^2$, $20^3$, $20^4$ are continuing their counter-clockwise circular rotation around adjacent pairs of receiving needles and in this movement the guide needles lay yarn across the top of the receiving needles as illustrated in FIGURE 13. In FIGURE 13 the lower hooks are omitted for clarity and because they have been moved or retracted away from the receiving needles. As soon as the guide needles 20 have laid the yarn across the top of the receiving needles as illustrated in FIGURE 13 an upper hook needle 31 descends between each pair of receiving needles and forms another hook needle loop 47 in each length of the yarn. This time instead of being an upward loop as illustrated in FIGURE 11 a downward loop is formed as shown in FIGURE 14 and further movement of the hook needles serves to twist or loop the newly formed hook needle loops around the receiving needles. This time the hook needle loops in each case are drawn downwards and upwards around the receiving needles, the hook needle loop $47^1$ which is formed between the receiving needles $1^1$ and $1^2$ being looped around the needle $1^1$, the hook needle loop $47^2$ which is formed between the receiving needles $1^2$ and $1^3$ being looped around the needle $1^2$ and so on as illustrated in FIGURE 15.

As the production of fabric proceeds, the upper grooved roller 8 (FIGURES 2 and 3) in conjunction with the endless belt 13 pulls the loops along the receiving needles as they are formed. This movement being aided by the transverse bar 15.

The formation of guide needle loops 45 and the superimposed hook needle loops 46 and 47 ceases when sufficient fabric has been made and these loops are pulled off the receiving needles and subjected to an appropriate tension in a wale-wise direction to open out the loops of the intermediate courses, drawing receiving needle yarn from yarn reels 5, 6, 7 etc. The guide needle yarns 27, 28 etc. form the alternate courses of the complete fabric.

It will be understood from the foregoing that the receiving needles have two functions:

(i) they act as carriers for formed fabric loops, 45, 46, 47, and (ii) hold the receiving needle yarn designated $4^1$, $4^2$, $4^3$ etc.

When a sufficient number of fabric loops, 45, 46, 47 have been formed, on the receiving needles 1, or when the receiving needles 1 are full, the formation of further loops is ceased. The formed loops are thereafter pulled off the receiving needles 1 and loops of the intermediate courses developed by drawing yarn 4 from the receiving reels 5, 6, 7, etc. and applying tension in a wale-wise direction to open out the intermediate course loops. The receiving needles 1 themselves do not knit loops in the generally accepted sense because it is only when loops formed by the guide needles and hooks are withdrawn from the receiving needles and on to receiving yarns that intermediate course loops are formed. Alternate courses of the complete fabric are formed by guide needle yarn 4.

To remove fabric from the apparatus the endless belt 13 and rollers 9, 10, 11 are driven by driven roller 12 in the reverse direction (clockwise, in FIGURE 3) to that required for the loop-forming process described. This serves to push out the free ends of the receiving needle yarns 4 in the form of loops from underneath the receiving needle ends. The receiving needle yarn extends from the spools 5, 6, 7 along the top surface of the said needles down through the respective eyes and backwards a short distance along the underside of the needles. The position of a free end 50' is shown in FIGURE 18 on that side of eye 2' in needle 1' away from the spools 5, 6, 7. Thus a pull (from left to right in FIGURE 18) will extend the yarn 4' to the position shown in FIGURE 17. These loops and guide needle yarns 26 (FIGURE 8) on the guide needle eyes away from the yarn reels 23, 24, 25 are clamped and pulled slowly away from the receiving needles 1. The top front driven roller 8 is now rotated counter-clockwise (FIGURE 3) and the endless belt 13 is rotated clockwise (FIGURE 3) so as to assist in pulling off the guide needle loops 45, the hook needle loops 46 and 47 and receiving needle yarn 4. The transverse bar 15 moved by worm 17 and worm wheel 18 are also at this stage reversed in the direction of motion described aforesaid for loop formation, so that bar 15 now moves from left to right (FIGURES 2 and 3) towards the operative receiving needle ends. An additional pair of transverse grooved rollers 48, 49 as illustrated diagrammatically in FIGURE 16 having teeth between each two receiving needle threads 4 is preferably provided to push the guide needle loops 45 out of the plane in which they lie, and draw off more receiving needle yarn 4 for the purpose of developing the receiving needle yarn 4 into the loops of the intermediate courses. The clamp referred to earlier consists of a pair of jaws, one on each side of the plane of the needles. The clamp comes down after the guide needles or receiving needles have been drawn back to provide sufficient space between the two sets of needles. The clamp moves preferably downwards taking up the fabric as it comes off the receiving needles.

If desired the apparatus may allow the guide and receiving needles to move apart in which case, the guide needles may also assist to pull the spirals from the receiving needles. The guide needle yarn spirals need not be wrapped around the receiving needles too tightly, and some slackness may be introduced by the action of the endless belt 13 and rollers 8, 9 and 12 in pushing the spirals from right to left, FIGURES 2–3 and FIGURE 8.

The same belt and rollers driven in a reverse direction also facilitate the movement of guide needle spirals and receiving needle yarn when they come off the spirals. In this way, the receiving needle yarn can come off the spirals. In this way, the receiving needle yarn can come off with the guide needle yarn as the latter comes off the receiving needles, the receiving needle yarn drawing its supply from the spools 5, 6, 7. Tension on the receiving needle yarn on the side of the eye 2' FIGURE 18, from these spools 5, 6, 7 will draw further supply. This tension is partly determined by the ability of the guide needle yarn on either side to span the receiving needle spacing and form alternate loops of the fabric. Control is exercised by the rate of rotation of the belt 13 and rollers 8, 9, and 12, and by the movement of the clamps as mentioned on col. 5, line 74. The tension and control may be insufficient to open out the receiving needle yarn 4 into loops of equal size to the guide needle loops, as shown on the right hand side of FIGURE 17. This may be facilitated by increasing the tension on the guide needle yarn, and its yarn supply, or by some other suitable means. Grooved rollers 48 and 49, FIGURE 16, may be used, for example.

The rollers have been omitted from FIGURE 2 so as not to obscure the presentation of the general plan of the apparatus. The rollers would act on the forming fabric as it was pulled off the receiving needles and above or below the plane of the receiving needles, by the action of the clamp. The rollers 48 and 49, FIGURE 16 could run substantially parallel with the rollers 8 and 9 and above or below them. The position of rollers 48/49 is not critical so long as they lie one on either side of the fabric, and act so as to force the loops between them out of the plane of the fabric so opening them up, the rollers being sufficiently close to the ends of the reciving needles for yarn to be drawn for this purpose. In FIGURE 17, the loops and the receiving needles are shown schematically in the same plane. For fabric to be formed in this plane, the ends of the guide needles and receiving needles would have to accommodate the fabric as it is formed between them. The grooved rollers could then be located between the ends of these needles one roller above and one below the plane of these needles and the fabric.

The grooved rollers are only brought into position when the loops are being pulled off the fabric.

FIGURE 17 illustrates diagrammatically on the left some of the fabric still on the needles and on the right some guide needle and hook loops which have been withdrawn from the receiving needles and developed by applying tension in a wale-wise direction.

Tension in a wale-wise direction may be carried out by means such as grooved rollers of the kind illustrated in FIGURE 16.

FIGURE 17 shows diagrammatically in the right hand part the location of these guide and hook needle loops after they have been pulled off the receiving needles and are looped now only about the receiving needle yarn. Guide needle yarn 26 from reels 23, 24, 25 forms the second course shown in FIGURE 13 and every alternate course of the fabric. Interlocked with this course on one side is the intermediate course formed from receiving needle yarn 4 from one of reels 5, 6 and 7. Similarly, interlocked with this alternate course but on the other side is the intermediate course also formed from receiving needle yarn 4 from one of 5, 6 or 7 reels.

In FIGURE 17 at the left hand side the loops are illustrated in somewhat overlapped relation as in fact they would be during practical manufacture. The loops in FIGURES 10 to 15 have been opened out for the sake of clarity.

It will be appreciated that the apparatus as described is intended only to give one indication of a practical construction for carrying out the invention, and such apparatus may clearly be modified within the scope of the appended claims.

In FIGURE 17 loops 101, 102, 103 and 104 are indicated on the receiving needles at the left of the drawings and these same loops are indicated on the right of the drawings when the fabric loops have been opened out.

What I claim is:

1. A method of manufacturing interlocked looped fabric comprising rotating each guide needle of a number of parallel and coplanar guide needles in circular paths of substantially the same diameter to lay guide needle yarn around two adjacent receiving needles of a number of parallel and coplanar receiving needles, moving two hooks in elliptical paths around adjacent receiving needles so that a first hook catches yarn laid by the guide needle under the two adjacent receiving needles to form a loop in an alternate course over and around one of the two receiving needles, and so that a second hook catches yarn laid by the guide needle over the said two receiving needles to form a loop in the next alternate course under and around the other of the said two receiving needles, moving the hooks away from the receiving needles and the yarn, feeding the alternate course loops along the receiving needles as they are formed, catching yarn supplied to the receiving needles and drawing this yarn away from the receiving needles, clamping the receiving needle yarn and drawing the alternate course loops from the receiving needles over the clamped receiving yarn which forms intermediate courses between alternate courses of the fabric, and imparting tension in a wale-wise direction to open the course loops.

2. Apparatus for manufacturing interlocked looped fabric in a course-wise direction comprising a number of parallel and coplanar guide needles, a separate yarn supply for each guide needle for forming alternate courses of fabric, a number of parallel and coplanar receiving needles, a separate yarn supply for each receiving needle for forming intermediate courses of fabric between the alternate courses, means to move each guide needle to lay guide needle yarn around two adjacent receiving needles, a number of hooks disposed in planes on each side of the guide needles, means to move a hook disposed on one side of the guide needles so that one run of the guide needle yarn laid around two adjacent receiving needles is given an additional turn around one of the said adjacent receiving needles to form a loop in an alternate course, said last-named means being adapted to move a hook disposed on the other side of the guide needles so that the other run of the guide needle yarn laid around the said two adjacent receiving needles is given an additional turn around the other of the said two adjacent receiving needles to form a loop in the next alternate course, means to catch yarn supplied to the receiving needles and means to draw this yarn away from the receiving needles, and means for removing alternate course loops formed around the receiving needles on to the drawn receiving needle yarn whereby there is formed a fabric in which the yarn forming each loop in a course passes behind one leg of the immediately preceding loop in the same wale and in front of its other leg so that no two adjacent legs of a loop in any one course are engaged by yarn of the adjacent course either from in front or from behind but alternately from in front and behind.

3. Apparatus for manufacturing interlocked looped fabric in a course-wise direction comprising a number of parallel and coplanar guide needles mounted in a guide bar, a separate yarn supply for each guide needle for forming alternate courses of fabric, a number of parallel and coplanar receiving needles, a separate yarn supply for each receiving needle for forming intermediate courses of fabric between the alternate courses, a wheel rotatable by a crank mechanism and an eccentric pivotal connection between the guide bar and the wheel whereby each guide needle is movable in a circular path to lay guide needle yarn around two adjacent receiving needles, a number of hooks disposed in planes on each side of the guide needles, means to move a hook disposed on one side of the guide needles so that one run of the guide needle yarn laid around two adjacent receiving needles is given an additional turn around one of the said adjacent receiving needles to form a loop in an alternate course, said last-named means being adapted to move a hook disposed on the other side of the guide needles so that the other run of the guide needle yarn laid around the said two adjacent receiving needles is given an additional turn around the other of the said two adjacent receiving needles to form a loop in the next alternate course, means to catch yarn supplied to the receiving needles and means to draw this yarn away from the receiving needles, and means for removing alternate course loops formed around the receiving needles on to the drawn receiving needle yarn whereby there is formed a fabric in which the yarn forming each loop in a course passes behind one leg of the immediately preceding loop in the same wale and in front of its other leg so that no two adjacent legs of a loop in any one course are engaged by yarn of the adjacent course either from in front or from behind but alternately from in front and behind.

4. Apparatus for manufacturing interlocked looped fabric in a course-wise direction comprising a number of parallel and coplanar guide needles mounted in a guide bar, a separate yarn supply for each guide needle for forming alternate courses of fabric, a number of parallel and coplanar receiving needles, a separate yarn supply for each receiving needle for forming intermediate courses of fabric between the alternate courses, a wheel, an eccentric pivotal connection between the guide bar and the wheel whereby the guide needles are movable together in circular paths so that each guide needle lays yarn around two adjacent receiving needles, a number of hooks mounted in two hook bars, each hook bar being located in a channel in the guide bar disposed on each side of and parallel with the coplanar guide needles, a link interconnecting the two hook bars, said link being so connected to said wheel that rotation of the wheel causes the hooks of the hook bars to be moved in elliptical paths around a single receiving needle in synchronism with movement of the guide needles, the hooks on each side of the guide needles serving to form alternate course loops of guide needle yarn around the receiving needles, means to catch yarn supplied to the receiving needles and means to draw this yarn away from the receiving needles, and means for removing alternate course loops formed around the receiving needles on to the drawn receiving needle yarn whereby there is formed a fabric in which the yarn forming each loop in a course passes behind one leg of the immediately preceding loop in the same wale and in front of its other leg so that no two adjacent legs of a loop in any one course are engaged by yarn of the adjacent course either from in front or from behind but alternately from in front and behind.

5. Apparatus according to claim 4 including cam means between the hook bars and the channels in the guide bar so that, in use, the hooks are reciprocated in a direction substantially parallel to the guide needles.

6. Apparatus according to claim 2 wherein the means for removing alternate course loops formed on the receiving needles comprises an endless belt disposed immediately below the said needles.

7. A method of manufacturing interlocked looped fabric in a course-wise direction of formation of alternate courses comprising moving each guide needle of a number of parallel and coplanar guide needles in a path to lay guide needle yarn around two adjacent receiving needles of a number of parallel receiving needles, moving first and second hooks in paths around adjacent receiving needles so that a first hook catches yarn laid by a guide needle across the two adjacent receiving needles in one direction to form a loop in an alternate course around one of the two receiving needles and so that a second hook catches yarn laid by the guide needle across the said two receiving needles in the other direction to form a loop in the next alternate course around the other of the said two receiving needles, and feeding the alternate courses along the receiving needles as the courses are formed, removing the yarn laid about the receiving needles and drawing additional receiving yarn from a supply for the receiving needles and thereafter applying tension in a wale-wise direction to open out intermediate loops formed from the additional receiving yarn which interlocks neighbouring alternate courses.

8. A method of manufacturing interlocked looped fabric in a course-wise direction of formation of alternate courses which comprises moving each guide member of a number of parallel and coplanar guide members around two adjacent yarn carrying receiving members of a number of parallel receiving members in order to lay guide yarn around adjacent pairs of receiving members and moving pairs of hook members in paths about adjacent receiving members to catch the guide yarn laid about receiving members by the guide members and to form appropriately disposed hook member loops on each receiving member; removing the yarn laid about the receiving members and drawing additional receiving yarn from a supply for the receiving members and thereafter applying tension in a wale-wise direction to open out intermediate loops formed from the additional receiving yarn which interlocks neighbouring alternate courses.

References Cited by the Examiner
UNITED STATES PATENTS

| | | | |
|---|---|---|---|
| 1,721,154 | 7/1929 | Huse | 28—78 |
| 2,590,914 | 4/1952 | Adams | 66—1 |

DONALD W. PARKER, *Primary Examiner.*

RUSSELL C. MADER, *Examiner.*

J. H. LACHEEN, R. FELDBAUM, *Assistant Examiners.*